United States Patent
Jahan et al.

(10) Patent No.: US 8,755,367 B2
(45) Date of Patent: Jun. 17, 2014

(54) MULTI-CHANNEL RECEPTION SYSTEM INCLUDING A SUPERHETERODYNE-TYPE RECEIVER ASSOCIATED WITH SPECTRAL ANALYSERS WITH INSTANTANEOUS BANDWIDTH

(75) Inventors: Daniel Jahan, Bohars (FR); Cedric Cornu, Brest (FR)

(73) Assignee: Thales, Neuilly sur Seine (FR)

( * ) Notice: Subject to any disclaimer, the term of this patent is extended or adjusted under 35 U.S.C. 154(b) by 69 days.

(21) Appl. No.: 13/511,625

(22) PCT Filed: Nov. 24, 2010

(86) PCT No.: PCT/EP2010/068149
§ 371 (c)(1),
(2), (4) Date: May 23, 2012

(87) PCT Pub. No.: WO2011/064267
PCT Pub. Date: Jun. 3, 2011

(65) Prior Publication Data
US 2012/0281689 A1      Nov. 8, 2012

(30) Foreign Application Priority Data
Nov. 24, 2009  (FR) ...................................... 09 05640

(51) Int. Cl.
*H04J 1/00* (2006.01)
(52) U.S. Cl.
USPC .......................................... 370/343; 342/383
(58) Field of Classification Search
USPC .......................................... 370/343; 342/383
See application file for complete search history.

(56) References Cited

U.S. PATENT DOCUMENTS 5,625,871 A * 4/1997 Myer et al. ..................... 370/328
5,793,798 A * 8/1998 Rudish et al. ................. 375/260

(Continued)

FOREIGN PATENT DOCUMENTS

EP      421708 A2 *    4/1991
EP      0778678 A1     6/1997

(Continued)

*Primary Examiner* — Hassan Kizou
*Assistant Examiner* — Deepa Belur
(74) *Attorney, Agent, or Firm* — Baker & Hostetler LLP (57) ABSTRACT

A reception system including a receiver of superheterodyne type coupled to a processing means, the receiver including N antennas. Said receiver includes: N translation means, each being able to frequency translate signals delivered by the antenna considered, from a frequency sub-band of the span of interest to a restricted frequency band, and to frequency multiplex the signals belonging to said frequency sub-band; N first intermediate frequency bandpass filters, of bandwidth equal to said restricted frequency band, respectively coupled at the output of each translation means, and able to filter the translated and multiplexed signals; a coupling means able to sum the N filtered signals so as to deliver the set of summed signals via N outputs. The processing means includes N other translation means coupled to N other intermediate frequency bandpass filters of frequency bandwidth equal to L, themselves coupled to N spectral analyzers, all having the same restricted analysis frequency band of width L, each other translation means of rank i, i being an integer varying from 1 to N, being able to transpose the signals delivered by the coupling means with the aid of a translation signal having a frequency adapted to each other translation means, in such a way that the other intermediate frequency bandpass filter connected at the output of said other translation means, is able to filter the ith sub-band of the total frequency band of width L·N, to which the signals summed by the coupling means belong.

8 Claims, 3 Drawing Sheets

(56) References Cited

U.S. PATENT DOCUMENTS 5,818,389 A * 10/1998 Lazar ............................ 342/383
6,370,182 B2 * 4/2002 Bierly et al. .................. 375/140
2009/0092177 A1 4/2009 Dvorak et al.

FOREIGN PATENT DOCUMENTS

GB 2260049 A * 3/1993
WO 2009/013314 A1 1/2009

* cited by examiner

MULTI-CHANNEL RECEPTION SYSTEM INCLUDING A SUPERHETERODYNE-TYPE RECEIVER ASSOCIATED WITH SPECTRAL ANALYSERS WITH INSTANTANEOUS BANDWIDTH

CROSS-REFERENCE TO RELATED APPLICATIONS

This application is a National Stage of International patent application PCT/EP2010/068149, filed on Nov. 24, 2010, which claims priority to foreign French patent application No. FR 09 05640, filed on Nov. 24, 2009, the disclosures of each of which are incorporated by reference in their entireties.

FIELD OF THE DISCLOSED SUBJECT MATTER

The invention pertains to multichannel reception systems, that is to say those that are able to pick up incident waves with the aid of an antenna array. There are then as many signals of interest, that is to say carriers of information sought, as antennas, if it is desired to instantaneously acquire the entirety of the information.

The invention is specifically adapted to multichannel reception systems with restricted instantaneous band in which they are able to separate the various frequencies. The instantaneous band is termed restricted since it is lower (and generally much lower) than the entirety of the so-called span of interest covered, for example a few hundred MHz as compared with about ten GHz.

BACKGROUND

Thus, given that such a multichannel reception system possesses as many reception channels as antennas of interest (i.e. an integer N), it therefore possesses as many spectral analyzers. The latter are used as measurers able to separate the signals frequency-wise through the spectral resolution that they possess.

These N spectral analyzers are all identical. Moreover, each possesses a restricted instantaneous band. There are two origins to this restriction:
  the analyzers incorporate analog-digital converters having a limited analog band and a limited sampling frequency;
  a likewise limited calculation capacity so as to absorb the stream of data in real time.

On account of the use of these spectral analyzers, the reception system uses so-called superheterodyne reception channels. The latter make it possible, through a frequency transposition, to translate a frequency sub-band of the span of interest to a restricted frequency band associated with an intermediate frequency filter. This restricted band corresponds to the band of the spectral analyzer. This operation is repeated as necessary sub-band by sub-band so as to cover the whole of the span of interest.

As a variant, superheterodyne reception channels very generally employ double changes of frequency so as to cover a wide frequency band of interest while dealing with the problems of image frequencies. Stated otherwise, the translation of the frequency sub-band to the restricted band is very generally done in two steps.

It is noted that the translations performed are identical for all the superheterodyne reception channels of the reception system.

The instantaneous band of the reception system is that of the spectral analyzers incorporated in the reception system. It is therefore limited to a few hundred MHz. Given that the reception system must operate over a much larger span of interest (for example about ten GHz), this implies that certain transitory signals are not necessarily intercepted, and therefore that there is a probabilistic notion in the interception (cf. probability of interception).

SUMMARY

An aim of the invention is notably to solve the aforementioned problem by improving the probability of interception of the reception system.

For this purpose, according to a first aspect of the invention, there is proposed a reception system comprising a receiver of superheterodyne type coupled to a processing means, the receiver comprising a number N of antennas, each being able to pick up signals representative of incident waves over a given frequency span of interest and to deliver corresponding signals, N being an integer.

According to a general characteristic of this first aspect, said receiver comprises:
  N translation means, each being able:
    to frequency translate signals delivered by the antenna considered, from a frequency sub-band of the span of interest (the sub-band being termed the instantaneous band of the receiver) to a restricted frequency band, and
    to frequency multiplex the signals belonging to said frequency sub-band,
  N first identical intermediate frequency bandpass filters, of bandwidth equal to said restricted frequency band, respectively coupled at the output of each translation means, and able to filter the translated and multiplexed signals,
  a coupling means able to sum the N filtered signals so as to deliver the set of summed signals via N outputs.

The processing means comprises N other translation means coupled to N other bandpass filters of mutually identical intermediate frequency different from the intermediate frequencies of the N first bandpass filters and of frequency bandwidth equal to L, themselves coupled to N spectral analyzers, all having the same restricted analysis frequency band of width L.

Each other translation means of rank i, i being an integer varying from 1 to N, is able to transpose the signals delivered by the coupling means with the aid of a translation signal having a frequency adapted to each other translation means, in such a way that the other intermediate frequency bandpass filter connected at the output of said other translation means, is able to filter the $i^{th}$ sub-band of the total frequency band of width L·N, to which the signals summed by the coupling means belong.

Stated otherwise, the first translation performed by the translation means makes it possible to disperse or to multiplex the N channels frequency-wise. The second translation performed by the other translation means makes it possible to spread the entirety of the instantaneous band to be received on the N spectral analyzers. This is made possible by the frequency-separating capability of the spectral analyzers able to isolate the N intentionally frequency-dispersed signals so as to analyze them in parallel.

Such a device using N spectral analyzers, each having an instantaneous band L, is able to work on an instantaneous band that is N times as large (N·L).

But this can also make it possible to use spectral analyzers with reduced instantaneous band, for reasons of cost or resolution in terms of dynamic range (number of bits), while offering an acceptable effective instantaneous band.

According to one embodiment, each spectral analyzer is also able to technically analyze the signals filtered by the other intermediate frequency bandpass filters, and to deliver technical characteristics as output.

According to one embodiment, each translation means of rank i is able to frequency translate the signals delivered by the corresponding antenna by a value equal to:

$$f_0 + \Delta f_i,$$

where:
 $f_0$ is a frequency value common to each of the translation means, and
 $\Delta f_i$ is a frequency shift specific to each translation means.

Preferably, the shifts $\Delta f_i$ specific to each translation means of rank i are defined such that:

$$\Delta f_{i+1} \geq \Delta f_i + \Delta f_{spectrum}, \text{ where}$$

$\Delta f_i$ is the frequency shift carried out by the translation means of rank i,
 $\Delta f_{i+1}$ is the frequency shift carried out by the translation means of rank i+1, and
 $\Delta f_{spectrum}$ is the width of the spectrum of the signals implemented by said system.

According to one embodiment, the receiver can furthermore comprise N delay lines respectively coupled between the output of one of the N translation means and the coupler, each delay line being able to delay the signal translated and frequency multiplexed by the translation means with which it is associated, by its own specific time delay.

Preferably, each delay $\tau_i$ of each delay line, i varying between 1 and N, is defined such that:

$$\tau_{i+1} \geq \tau_i + \text{Max}(LI + \tau_{prop}),$$

where:
 LI is the width of the pulse considered, delayed by the delay line of rank i, and
 $\tau_{prop}$ is the maximum propagation delay between two antennas.

According to one embodiment, said processing means can furthermore comprise:
 an auxiliary means able to group together the technical characteristics delivered by the spectral analyzers corresponding to one and the same incident wave,
 a means for technical characterization of the pulses, coupled at the output of the auxiliary means, able to technically analyze each pulse on the basis of the technical characteristics delivered by the spectral analyzers.

According to a second aspect of the invention, there is proposed a use of a system such as mentioned hereinabove to perform goniometry.

BRIEF DESCRIPTION OF THE DRAWINGS

Other advantages and characteristics of the invention will be apparent on examining the detailed description of a wholly non-limiting embodiment of the invention and appended drawings in which.

DETAILED DESCRIPTION

Figures 1, 2:
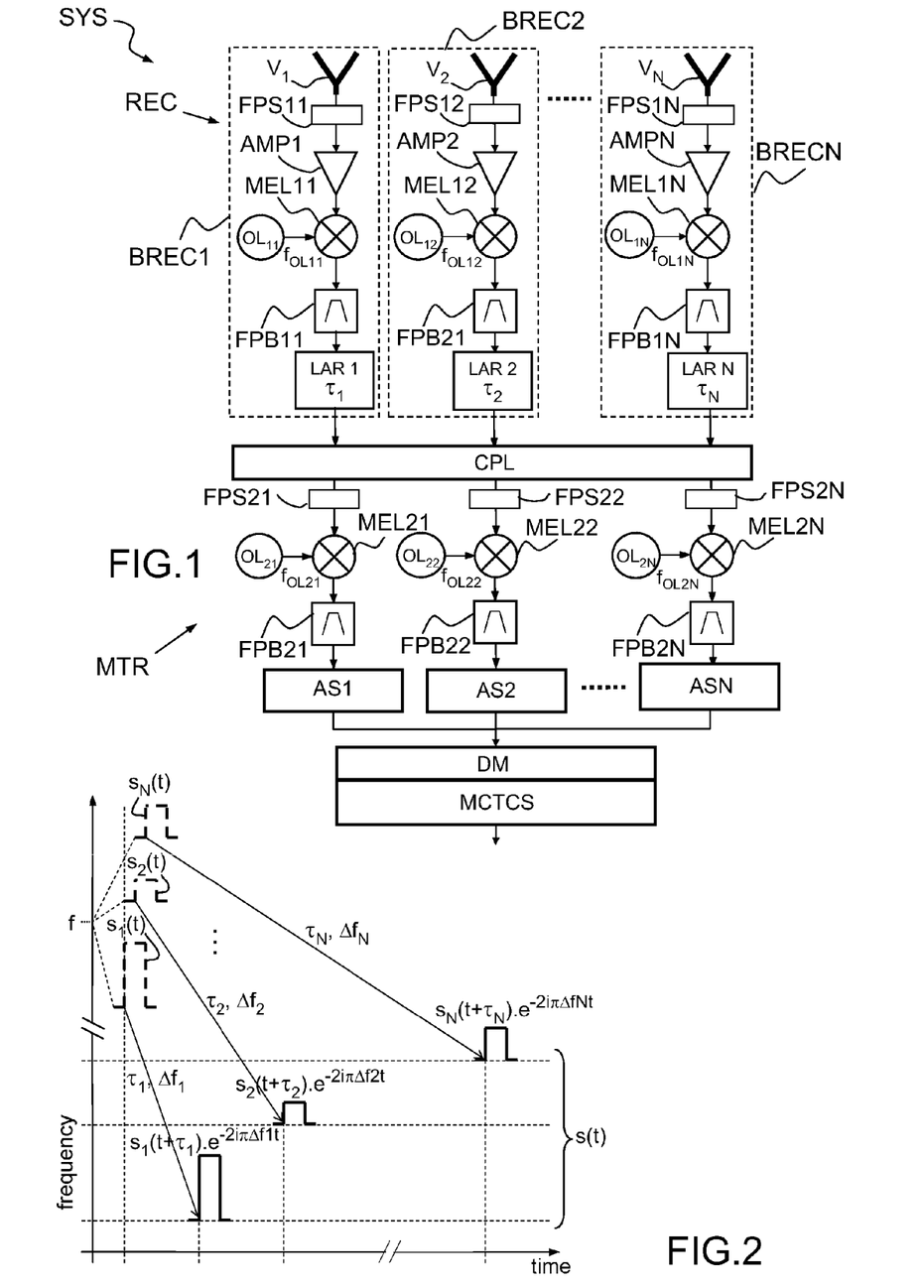
FIG. 1 illustrates an embodiment of the invention.
FIG. 2 represents signals implemented by the embodiment of FIG. 1.

FIG. 1 is referred to. The reference SYS denotes a multi-channel reception system according to a first embodiment of the invention. The system SYS comprises a receiver of superheterodyne type REC coupled to a processing means MTR.

A receiver of superheterodyne type makes it possible to restrict the frequency band to a value acceptable by a spectral analyzer.

The receiver REC comprises N reception blocks BREC1, . . . , BRECN, N being an integer. Each reception block BREC1, . . . , BRECN comprises an antenna respectively referenced $V_1, \ldots, V_N$. In this case, the antennas $V_1, \ldots, V_N$ are for example equidistant. Each antenna $V_1, \ldots, V_N$ is able to pick up a signal representative of incident waves, whose frequency belongs to a span of interest related to the use of the system SYS.

For example, if the system SYS is incorporated within a radar detector, this span may be from 2 to 18 GHz.

It is noted that as a variant, it is possible to associate a detection threshold with each antenna, so as to consider only the received signals whose power exceeds the detection threshold.

In this example it is considered that each signal picked up by an antenna is a brief pulse.

The output of each antenna $V_1, \ldots, V_N$ is connected to a preselection filter FPS11, . . . , FPS1N. The function of the latter is to tap off just a part of the total frequency band, in such a way that at the output of the mixers described hereinafter, no undesirable frequency appears in the resulting frequency band.

The output of each preselection filter FPS11, . . . , FPS1N is linked to an amplifier, respectively referenced AMP1, . . . , AMPN.

Each amplifier AMP1, . . . , AMPN is able to amplify the pulses delivered by the filter to which it is coupled.

Each reception block BREC1, . . . , BRECN comprises a first set of local oscillators $OL_{11}, \ldots, OL_{1N}$. The local oscillators $OL_{11}, \ldots, OL_{1N}$ may be formed by those conventionally incorporated within receivers of superheterodyne type, but they must have mutually independent settings so as to be able to carry out the frequency multiplexing law.

Each local oscillator $OL_{11}, \ldots, OL_{1N}$ is respectively coupled to the input of a mixer MEL11, . . . , MEL1N (translation means), the other input of the latter receiving the output of an amplifier AMP1, . . . , AMPN.

More precisely, each local oscillator $OL_{11}, \ldots, OL_{1N}$ delivers a signal at a given frequency $f_{OL11}, \ldots, f_{OL1N}$ so as to frequency translate the amplified pulses, each of them being delivered by the corresponding amplifier AMP1, . . . , AMPN, to a chosen restricted frequency band, dependent on the processing performed downstream. This frequency translation will be explained in greater detail hereinafter.

The values of the frequencies $f_{OL11}, \ldots, f_{OL1N}$ are variable as a function of the frequency sub-band to which the frequencies of the received signals belong.

More precisely, as explained in greater detail hereinafter:

$$f_{OL1i} = f_0 + \Delta f_i,$$

where:
 $f_0$ is a frequency value common to each of the translation means, and
 $\Delta f_i$ is a frequency shift specific to each translation means.

It is pointed out that it is preferable that the following operating criterion be adhered to, so as to safeguard the spectral integrity of the signals considered:

$$\Delta f_{i+1} \geq \Delta f_i + \Delta f_{spectrum}, \text{ where}$$

$\Delta f_i$ is the frequency shift carried out on the output signal of the mixer of rank i, and $\Delta f_{spectrum}$ is the width of the spectrum of the signals received by the system SYS.

Stated otherwise, this criterion enables the multiplexed and frequency translated signals to be summed without the respective spectra overlapping. They will therefore be able to be extracted by frequency filtering.

At the output of the mixer MEL11, ..., MEL1N, each pulse is therefore shifted in frequency and consequently belongs to a chosen restricted frequency band, this restricted frequency band being identical for each reception block of the reception system SYS.

Each pulse is then delivered to a first so-called intermediate frequency bandpass filter FPB11, ..., FPB1N, identical on the N reception blocks (for example with a passband lying between 3.5 and 5.5 GHz) so as to:

on the one hand restrict the frequency band conveyed to the rest of the circuit, and on the other hand, retain only the desired product on exit from the mixer.

The output of each first filter FPB11, ..., FPB1N is respectively coupled to a delay line LAR1, ..., LARN. The role of this delay line is to delay, if necessary, the amplified pulse by a chosen delay, $\tau_i$. This delay is defined in greater detail hereinafter.

Stated otherwise, the delay lines LAR1, ..., LARN and the coupler CPL make it possible to carry out a temporal multiplexing according to the delays $\tau_i$.

The outputs of the set of delay lines are coupled to the processing means MTR and more particularly linked to a coupler CPL incorporated within the processing means MTR. The function of the latter, there being just one processing means for the set of N pulses delivered by the delay lines LAR1, ..., LARN, is to sum the frequency- and time-multiplexed pulses so as to form and deliver one single signal encompassing all the useful information. An exemplary architecture of the coupler CPL will be described in greater detail hereinafter.

Thus, at the output of the coupler CPL, as represented in FIG. 2, the signal s(t) delivered is formed of pulses $s_i(t+\tau_i) \cdot e^{-2i\pi\Delta f_i t}$, shifted in time and in frequency (i lying between 1 and N). It is recalled that $\Delta f_i$ represents the deviation in frequency between the initial value of the frequency of the pulse of rank i, $s_i(t)$, and the value of the final frequency after the frequency translation performed by the local oscillator $OL_{1i}$.

Moreover, if necessary subsequently, in order that the pulses do not overlap at the moment of coupling, the delay $\tau_i$ inserted by each delay line must then preferably adhere to the condition hereinbelow:

$$\tau_{i+1} \geq \tau_i + \text{Max}(LI + \tau_{prop}),$$

where:

LI is the width of the pulse considered, delayed by the delay line of rank i, and $\tau_{prop}$ is the maximum propagation delay between two antennas.

However, this condition is absolutely not necessary.

The propagation time $\tau_{prop}$ is related to the shift in space of one antenna with respect to the other within the system. In this way, the temporal integrity of each pulse is safeguarded.

FIG. 1 is referred to again.

By way of example, the delay lines LAR1, ..., LARN and the coupler CPL may be produced with the aid of hyper-optical transformation devices well known to the person skilled in the art. The advantage of this type of device for the delay lines LAR1, ..., LARN is the ability to implement high delays easily. Furthermore, they give rise to few losses for the processed signals and minimize bulkiness.

As a variant, the delay lines LAR1, ..., LARN may be notch-wise adjustable (technique well known to the person skilled in the art), so as to allow parametrization, as necessary.

The coupler CPL comprises N outputs each being connected to a preselection filter FPS21, ..., FPS2N. Like the previous preselection filters, the function of the latter is to tap off just a part of the total frequency band, in such a way that at the output of the other mixers described hereinafter, no undesirable frequency appears in the resulting frequency band.

Thus, the outputs of the preselection filters FPS21, ..., FPS2N are connected to other mixers respectively referenced MEL21, ..., MEL2N. The coupler CPL sums the set of pulses that it receives from the delay lines LAR1, ..., LARN.

Each of these other mixers MEL21, ..., MEL2N (other translation means) receives on an input a signal at a given chosen frequency $f_{OL21}, \ldots, f_{OL2N}$, so as to translate the signals received from the coupler by the value of the frequency considered $f_{OL21}, \ldots, f_{OL2N}$.

Each of these signals is delivered by another series of local oscillators $OL_{21}, \ldots, OL_{2N}$.

The values of the frequencies $f_{OL21}, \ldots, f_{OL2N}$ are different. They are chosen in such a way that, for each channel, a different sub-band belonging to the total frequency band to which the pulses delivered by the coupler CPL belong is filtered by another intermediate frequency bandpass filter coupled downstream.

More precisely, if it is considered that the total frequency band to which the pulses delivered by the coupler CPL belong may be divided into N sub-bands, the total frequency band is frequency translated by a chosen value with the aid of a mixer MEL21, ..., MEL2N in such a way that each translated sub-band can be filtered by one of the intermediate frequency bandpass filters FPB21, ..., FPB2N.

These other bandpass filters FPB21, ..., FPB2N are all similar from one channel to the other and of a restricted frequency band.

This frequency band is defined by a spectral analyzer AS1, ..., ASN coupled at the output of the corresponding bandpass filter FPB21, ..., FPB2N.

Conventionally, each spectral analyzer corresponds to a filter bank able to separate signals that are sufficiently far apart in terms of frequency.

Each spectral analyzer provides a set of technical characteristics able to describe the signal considered.

For example, these technical characteristics can comprise the central frequency of the spectrum, its optional modulation law (in terms of frequency or phase), its amplitude or its power, its duration or width if it is a pulse, its arrival date.

These technical characteristics are then dispatched to an auxiliary means, here a demultiplexing means DM.

Moreover, the auxiliary means DM works on a time-frequency window defined according to the largest of the deviations in delays and deviations in frequency shifts, i.e.:

$$[\text{Max}(\tau_i - \tau_k), \text{Max}(\Delta f_i - \Delta f_k)].$$

The demultiplexing of the data makes it possible to group the analyses of the pulses belonging to one and the same wave picked up in parallel by several antennas and arising from the frequency multiplexing and time multiplexing with the aid, respectively, of the frequency shifts $\Delta f_i$ of the delays $\tau_i$. According to the type of antenna array and the power of the incident wave, in particular in the case of a circular array (directional antennas pointed in different directions), certain antennas will be able to deliver signals having an unutilizable power level implying that, on completion of the grouping effected by the auxiliary means, the latter will not necessarily give N technical analyses of pulses.

The grouping of the pulse technical analyses by the auxiliary means DM is done:
- over a sliding correlation window, both in respect of time and in respect of frequency, so as to monitor the time which passes and to scan the frequency band to which the pulses delivered by the coupler CPL belong,
- by resemblance of the stable technical parameters, that is to say those which do not depend on the antennal array and on the direction of arrival of the wave at the array.

More precisely, the demultiplexing carried out by the auxiliary means DM (that is to say the association of the N pulses arising from the N antennas and corresponding to the same intercepted wave) is done by correlation.

The latter can only be done in respect of characteristics that are invariant in each of the N pulses and in respect of the recognition of the time-multiplexing and frequency-multiplexing laws. The invariant characteristics in respect of the N pulses are those which are specific to the wave, independently of any geometric consideration related to the antenna array and to its illumination by the incident wave. Thus the power, the arrival date and the phase of the pulses are not invariants, but are carrier characteristics, respectively of different relative illuminations due to the radiation patterns and to the path length differences.

The general principle of the demultiplexing is effected by the grouping (or sorting) of the pulses, based on the similarity of their invariant technical characteristics and the similarity of the relative distributions of the frequencies and of the arrival dates with respect to the respective multiplexing laws which are known.

Accordingly, mathematical operations are carried out for comparing values of quantities of like nature. As these values arise both from measurements and from hardware definitions, it is appropriate to carry out the comparisons while taking account of tolerances related, respectively, to the measurement errors and to the hardware definitions. These operations are similar to those used in functions for fusion, classification, tracking, etc. They are considered to be conventional and known to the person skilled in the art.

Finally, the auxiliary means DM is coupled to a means for consolidated and goniometric technical characterization of the pulses MCTCS. The function of the latter means is to estimate on the basis of the technical analyses of the grouped (at the maximum N) pulses (or elementary signals) delivered by the auxiliary means DM:
- on the one hand the direction of arrival (goniometric) of the incident waves by conventional techniques using the distribution of the powers, the distribution of the real arrival dates (that is to say compensated for the delays $\tau_i$), the distribution of the phases (subject to the proviso that it is possible to compensate the phase variations arising from the frequency differences and from the time differences), and
- on the other hand of refined technical parameters, arising as they do from the set of measurements which characterize the incident wave and are received by the antennas $V_1, \ldots, V_N$.

Figure 3:
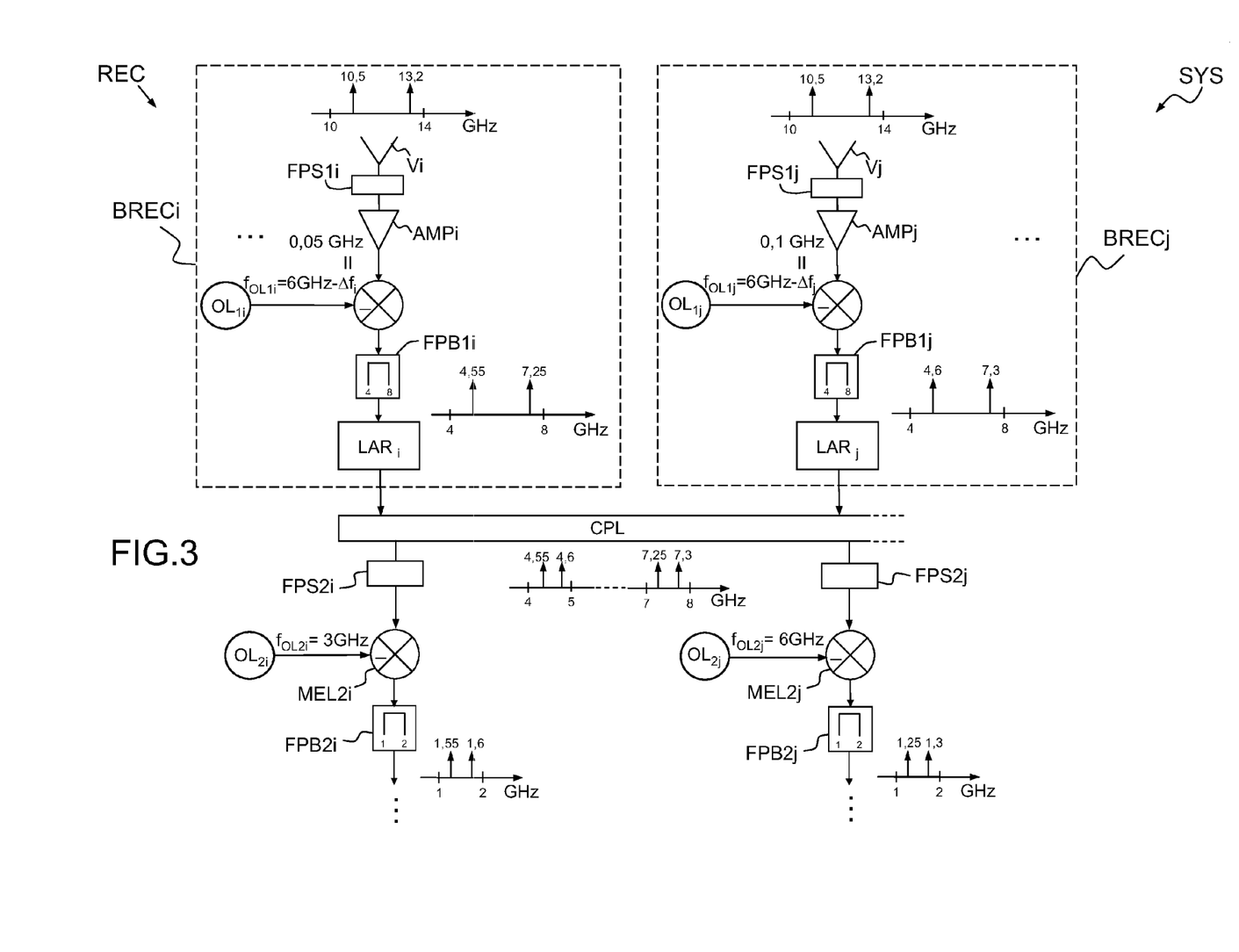
FIG. 3 illustrates in greater detail the manner of operation of the embodiment of FIG. 1.

Reference is now made to FIG. 3 which illustrates in greater detail an exemplary manner of operation of the reception system according to the invention.

In this example, for the sake of simplification only two reception blocks BRECi and BRECj are considered. We are interested in a frequency sub-band of the whole of the span of interest. This frequency sub-band lies between 10 GHz and 14 GHz. Each antenna $V_i$ and $V_j$ of the reception blocks BRECi and BRECj picks up two incident waves at the respective frequencies of 10.5 GHz and 13.2 GHz. These waves are each amplified by the amplifiers AMPi and AMPj after the preselection filters FPB1$i$, FPB1$j$ have tapped off the appropriate part of the total band.

A first frequency translation is performed with the aid of the local oscillators $OL_{1i}$ and $OL_{1j}$. The translation frequencies $f_{OLi}$ and $f_{OLj}$ are chosen so as to translate the aforementioned frequency sub-band at the level of the restricted frequency band of the intermediate frequency bandpass filters FPB1$i$ and FPB1$j$, which here lies between 4 and 8 GHz. The aim of this frequency translation is also to introduce a frequency multiplexing of the signals (as may be seen in FIG. 2) so as to allow their separation in the course of the analysis.

This multiplexing is performed with the aid of frequency shifts $\Delta f_i$, $\Delta f_j$.

Thus, for this example, for the reception block BRECi, the frequency shift is equal to 6 GHz-$\Delta f_i$, where $\Delta f_i$ is equal to 0.05 GHz. The frequencies of the resulting signals are then 4.55 GHz and 7.25 GHz.

For the reception block BRECj, the frequency shift is equal to 6 GHz-$\Delta f_j$, where $\Delta f_j$ is equal to 0.1 GHz. Thus, frequencies of the resulting signals are 4.6 GHz and 7.3 GHz.

The frequency-shifted signals are filtered, respectively by the intermediate frequency bandpass filters FPB1$i$ and FPB1$j$. In this example, the signals are also delayed temporally by the delay lines LARi and LARj, so as to perform a time-division multiplexing.

Next the coupler CPL sums the set of time- and frequency-multiplexed pulses. The preselection filters FPS2$i$ and FPS2$j$ tap off the appropriate frequency band, thereby avoiding any subsequent spectrum aliasing.

Next, the second frequency translation is performed. The aim of the latter is that the frequency band to which the pulses delivered by the coupler CPL belong be filtered by the series of intermediate frequency bandpass filters coupled downstream.

In this example, only the sub-bands lying between 4 and 5 GHz and 7 and 8 GHz are considered, since only two bandpass filters are considered. In reality, to filter the whole of the frequency band, it would be necessary to consider four intermediate frequency bandpass filters.

But to simplify the description, only the two aforementioned sub-bands are treated.

So that the first sub-band between 4 and 5 GHz can be filtered by the intermediate frequency bandpass filter FPB2$i$, the frequency band at the output of the coupler CPL is translated by $f_{OL2i}$=3 GHz.

The filtering by the filter FPB2$i$ makes it possible to preserve the pulses whose translated frequencies are at present equal to 1.5 and 1.6 GHz.

Likewise, so that the second sub-band between 7 and 8 GHz can be filtered by the intermediate frequency bandpass filter FPB2$j$, the frequency band at the output of the coupler CPL is translated by $f_{OL2i}$=6 GHz.

The filtering by the filter FPB2$i$ makes it possible to preserve the pulses whose translated frequencies are at present equal to 1.2 and 1.3 GHz.

The number of outputs of the coupler CPL and therefore the number of frequency sub-bands "arising" from the total band are dependent on the number of repetitions of the restricted frequency band (of width L) corresponding to the instantaneous analysis band of each intermediate frequency bandpass filter within the frequency band to which the pulses delivered by the coupler CPL belong.

In this example, this bandwidth L is equal to 1 GHz.

The total width of the band that the system is able to analyze is therefore equal to N·L, N being the number of outputs of the coupler CPL.

The devices of the prior art, having to acquire the perception of a wave on N channels, very generally possess N identical analysis channels, disposed in parallel, each having a given instantaneous band.

The advantage of the invention is that it increases the instantaneous reception band of the reception system, thereby improving interception and the associated probability.

As a variant, it is possible to perform the shift and the same frequency multiplexing on a grouping of reception blocks. If the reception system comprises p groupings of channels, the coupling means then being formed of p sub-couplers, able to sum the outputs of the grouping of reception blocks.

A spectral analyzer and an associated intermediate frequency bandpass filter is then coupled to the output of each of the p sub-couplers.

Figure 4:
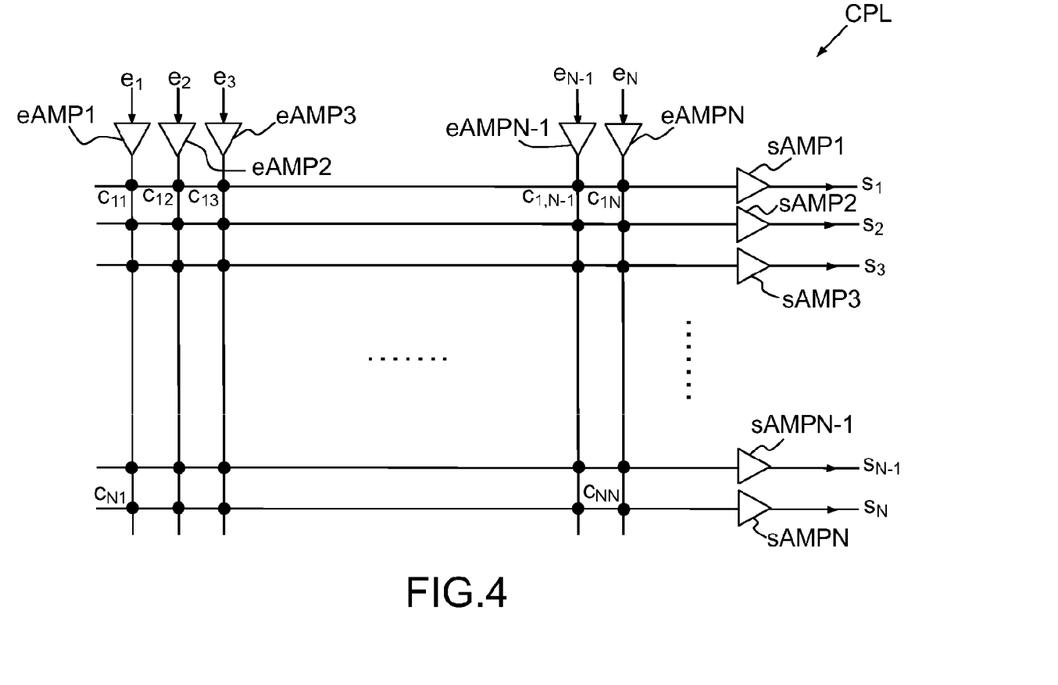
FIG. 4 illustrates an embodiment of a coupler incorporated into the invention.

This variant is possible by virtue of a suitably adapted structure of the coupler CPL, an example of which is illustrated in FIG. 4.

Each input referenced e1, ..., eN receives the output signal delivered by the delay line LAR1, ..., LARN to which it is connected. Each input is associated with an amplifier eAMP1, ..., eAMPN able to amplify the input signal.

Each output referenced s1, ..., sN is linked to the input of a preselection filter FPS21, ..., FPS2N. Each output is associated with an output amplifier sAMP1, ..., sAMPN able to amplify the signal before it is delivered at the output of the coupler CPL.

At the interconnection of each row of rank i and column of rank j is disposed a switch Cij. The latter makes it possible to establish the connection between the input associated with column i and the output associated with row j.

Figure 5:
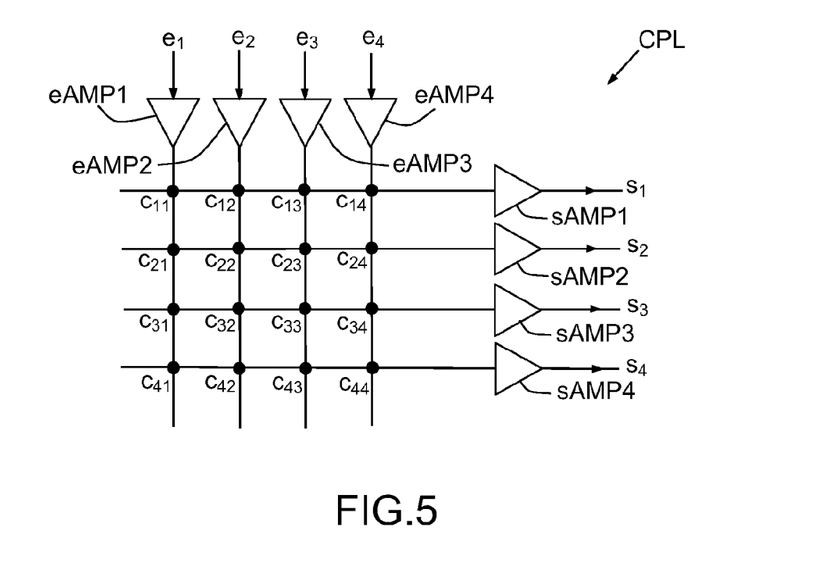
FIG. 5 illustrates in a simplified manner the manner of operation of a coupler according to the invention.

FIG. 5 illustrates the manner of operation of such a coupler CPL. So as to simplify the description, a coupler CPL with only four inputs e1, ..., e4 and four outputs s1, ..., s4 is considered.

It is considered that a switch Cij (i and j each varying between 1 and 4) connects an input and a column when it is in the "1" state and disconnects it when it is in the "0" state (positive logic).

Three possible configurations exist.

A) The first configuration makes it possible to process all the spectra received in "parallel", this corresponding to the conventional configuration, used in the state of the art. In this case, we get:

$$\begin{cases} Cij = 1 & \forall i = j \\ Cij = 0 & \forall i \neq j \end{cases}.$$

B) The second configuration makes it possible to process all the spectra in series, this corresponding to the configuration described hereinabove. In this case, we get: $C_{ij}=1$ ∀i and j.

C) The third so-called series-parallel configuration is intermediate, it forms part of the field of the invention. In this case for four channels, we get:

$$\begin{cases} C11 = C12 = C21 = C22 = 1 \\ C13 = C14 = C23 = C24 = 0 \end{cases} \text{serialization of the outputs } s1 \text{ and } s2;$$

$$\begin{cases} C31 = C32 = C41 = C42 = 0 \\ C33 = C34 = C43 = C44 = 1 \end{cases} \text{serialization of the outputs } s3 \text{ and } s4.$$

The invention claimed is:

1. A reception system comprising a receiver of superheterodyne type coupled to a processing means, the receiver comprising a number N of antennas, each being able to pick up signals representative of incident waves over a given span of interest and to deliver corresponding signals, N being an integer, said receiver comprising:
   N translation means, each being able:
      to frequency translate signals delivered by the antenna considered, from a frequency sub-band of the span of interest to a restricted frequency band, and
      to frequency multiplex the signals belonging to said frequency sub-band;
   N first identical intermediate frequency bandpass filters, of bandwidth equal to said restricted frequency band, respectively coupled at the output of each translation means, and able to filter the translated and multiplexed signals; and
   a coupling means able to sum the N filtered signals so as to deliver the set of summed signals via N outputs;
   wherein the processing means comprises N other translation means coupled to N other bandpass filters of mutually identical intermediate frequency different from the intermediate frequencies of the N first bandpass filters and of frequency bandwidth equal to L, themselves coupled to N spectral analyzers, all having the same restricted analysis frequency band of width L;
   wherein each of the other translation means of rank i, i being an integer varying from 1 to N, is able to transpose the signals delivered by the coupling means with the aid of a translation signal having a frequency adapted to each other translation means, in such a way that the other intermediate frequency bandpass filter connected at the output of said other translation means, is able to filter the $i^{th}$ sub-band of the total frequency band of width L·N, to which the signals summed by the coupling means belong.

2. The system as claimed in claim 1, in which each spectral analyzer is also able to technically analyze the signals filtered by the other intermediate frequency bandpass filters, and to deliver technical characteristics as output.

3. The system as claimed in claim 1, in which each translation means of rank i is able to frequency translate the signals delivered by the corresponding antenna by a value equal to:

$f_0+\Delta f_i$, where:
   $f_0$ is a frequency value common to each of the translation means, and
   $\Delta f_i$ is a frequency shift specific to each translation means.

4. The system as claimed in claim 3, in which the shifts $\Delta f_i$ specific to each translation means of rank i are defined such that:

$\Delta f_{i+1} \geq \Delta f_i + \Delta f_{spectrum}$, where $\Delta f_i$ is the frequency shift carried out by the translation means of rank i,
   $\Delta f_{i+1}$ is the frequency shift carried out by the translation means of rank i+1, and
   $\Delta f_{spectrum}$ is the width of the spectrum of the signals implemented by said system.

5. The system as claimed in claim 1, in which the receiver furthermore comprises N delay lines respectively coupled between the output of one of the N translation means and the coupler, each delay line being able to delay the signal translated and frequency multiplexed by the translation means with which it is associated, by its own specific time delay.

6. The system as claimed in claim 5, in which each delay $\tau_i$ of each delay line, i varying between 1 and N, is defined such that:

$$\tau_{i+1} \geq \tau_i + \text{Max}(LI + \tau_{prop}),$$

where:
- LI is the width of the pulse considered, delayed by the delay line of rank i, and
- $\tau_{prop}$ is the maximum propagation delay between two antennas.

7. The system as claimed in claim 1, in which said processing means furthermore comprises:
- an auxiliary means able to group together the technical characteristics delivered by the spectral analyzers corresponding to one and the same incident wave; and
- a means for technical characterization of the pulses, coupled at the output of the auxiliary means, able to technically analyze each pulse on the basis of the technical characteristics delivered by the spectral analyzers.

8. The system as claimed in claim 1 wherein the system is further configured to perform goniometry.

* * * * *